Nov. 1, 1960 V. G. HAROLDSON 2,958,230
FASTENER STRUCTURE FOR PULLEYS AND THE LIKE
Filed Feb. 4, 1958
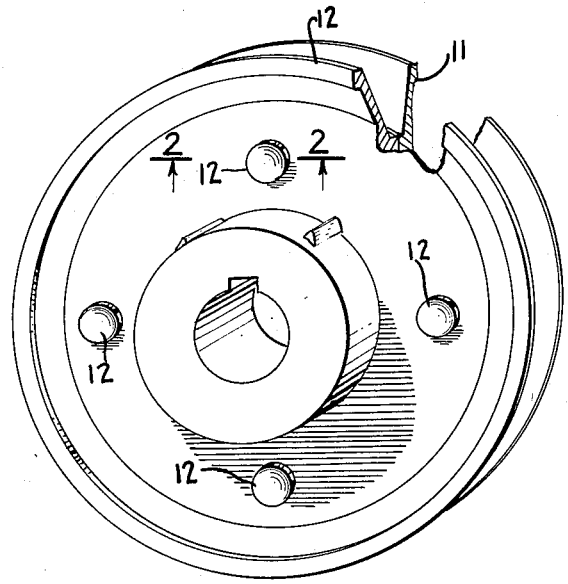
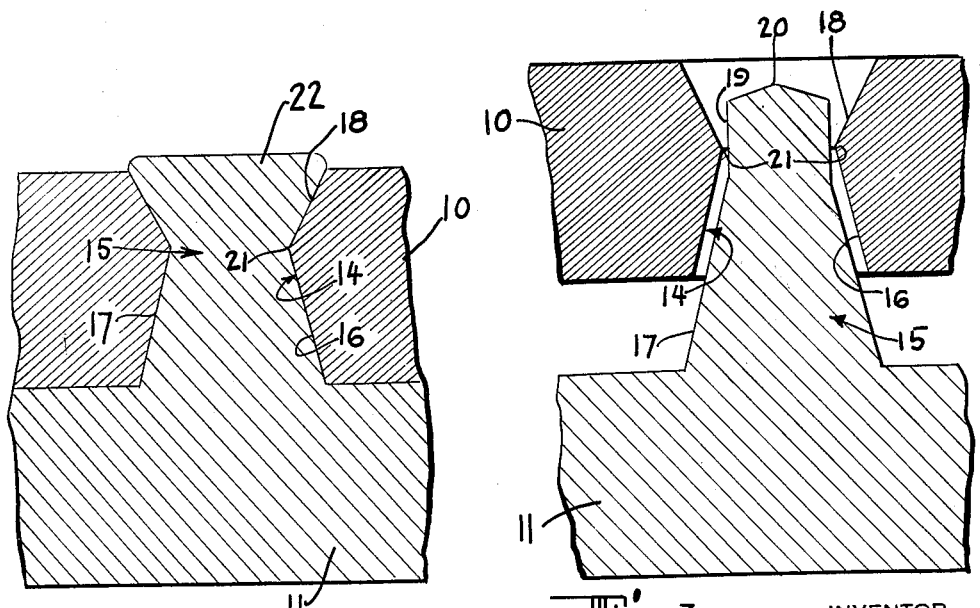
INVENTOR
Victor G. Haroldson
BY
Ernest A. Joenen
ATTORNEY

United States Patent Office 2,958,230
Patented Nov. 1, 1960

2,958,230

FASTENER STRUCTURE FOR PULLEYS AND THE LIKE

Victor Gottfrid Haroldson, 30 Notchpark Road, Little Falls, N.J.

Filed Feb. 4, 1958, Ser. No. 713,149

2 Claims. (Cl. 74—230.3)

The present invention relates to improved fastener structure for securing together a pair of members, such as the sheaves of a pulley, or other members subjected to rotational movement.

Heretofore, pulleys have been constructed of a pair of sheave members one of which had a plurality of circumferentially spaced apertures and the other of which had a plurality of studs each adapted to fit into and extend through and beyond an aperture to provide a portion adapted to be riveted or peened over the member formed with the apertures to hold the members together. In many instances where the pulley was subjected to considerable torque or high speed rotation, the riveted portions yielded slightly to loosen the members sufficiently to move laterally apart a minute distance. Since the apertures were slightly greater than the studs to provide clearance to enable the studs to enter the apertures, such slight loosening of the members permitted relative rotational movement between the members. As a result of such movement, the pulleys chattered, and, when subjected to high starting torque, the impact and shearing stress on the studs was excessive and eventually caused the same to break. In some cases where the studs did not break, the loose condition became worse and continued lateral movement destroyed the riveted connection, either by enlarging the apertures of wearing down the riveted portions to an extent whereby the members separated.

Such breakage is undesirable, and even slight movement between the members cannot be tolerated in instances where the pulley is of the type adapted to drive or be driven by a timing belt.

Accordingly, an object of the present invention is to overcome the foregoing difficulties and disadvantages by providing an improved structure for fastening members which are subjected to rotational movement.

Another object is to provide such structure wherein clearance between the studs and the apertures is eliminated when the members are secured together.

Another object is to provide such structure wherein the riveted portion has increased strength and resists forces tending to loosen the members.

A further object is to provide such structure which is simple, practical, reliable and economical.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

Fig. 1 is a perspective view of a pulley provided with the fastener structure in accordance with the present invention, a portion of the pulley being broken away.

Fig. 2 is an enlarged sectional view taken along the line 2—2 on Fig. 1, illustrating the fastener structure in detail.

Fig. 3 is a view similar to Fig. 2, illustrating the structure before securement of the pulley members has been effected.

Referring to the drawing in detail, a pulley is shown in Fig. 1 by way of example which comprises a pair of sheave members 10 and 11 having surfaces facing each other and being secured together by means of fastener structure 12 about to be described in detail.

The member 10 is formed with a plurality of circumferentially spaced apertures 14 extending therethrough, and the member 11 has a plurality of studs 15 formed integral therewith each of which extends through and beyond one of the apertures (Figs. 2 and 3). The apertures and studs have matching generally frusto-conical sections 16 and 17, respectively, which are located at and adjacent the ends nearest the facing surfaces. These sections are so dimensioned that the stud sections are adapted to be wedged into the aperture sections to entirely eliminate any clearance between the sections when the members are fastened in the manner described hereinafter. By generally frusto-conical is meant that the sections 16 and 17 may be in the form of a frustum of a cone or a pyramid.

The apertures 14 are also formed with a recess portion 18 at the end opposite the section 16 which may be flared upwardly as shown herein, and the studs are formed with an upper end portion 19 extending into the portion 18 when the members are placed to each other. These portions may be circular or polygonal in cross-section.

The tips 20 of the studs and the portions 19 are adapted to be deformed to increase their cross-sectional dimensions (Fig. 2), whereby the tips 20 can be riveted or otherwise deformed to draw the members together and the stud portions 19 are enlarged to fill the aperture portions 18.

In order to provide an extremely rugged riveted connection, the aperture portions 18 are somewhat larger than the stud portions 19 and an annular edge 21 is formed between the sections 16 and the portions 18 of the apertures (Fig. 3). This enables the stud portion 19 to be enlarged and overlie the edge 21 so that a rivet head 22 of considerable dimensions is formed in the aperture portions 18 (Fig. 2). This structure provides a greatly strengthened fastening connection between the members.

The apertures 14 and the studs 15 are so dimensioned that the stud portion 19 passes through the opening provided by the annular edge 21 when the facing surfaces of the sheaves 10 and 11 are brought together as shown in Fig. 3, and that the aperture and stud sections 16 and 17, respectively, fit so tightly upon coming in contact with each other that considerable pressure is required to bring the facing sheave surfaces together. This wedge fit slightly deforms the sections 16 and 17 and causes the sheaves to be held securely together in assembly prior to deforming the stud portion 19 to complete the securement of the sheaves.

It will be understood that the members 10 and 11 can be formed of any suitable material so long as the studs are deformable as previously indicated herein. It has been found that this fastener structure is particularly adaptable for members constructed of cold deformable metals such as die cast aluminum members, for example.

While the present invention has been desired by way of example in connection with pulley structure, it will be understood that the fastener structure can be utilized for securing other types of members.

From the foregoing description, it will be seen that the present invention provides an improved fastener structure at no increase in cost which can withstand such rugged use to which it is normally subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A pulley comprising a pair of sheave members each constructed of an identical, cold deformable metal and having a surface abutting the other, one of said members having a plurality of apertures extending therethrough and the other of said members having a plurality of studs formed integral therewith and each extending through and beyond one of said apertures, said apertures and said studs having generally frusto-conical sections at and adjacent their ends nearest the facing surfaces of said members, said sections being so predimensioned that said stud sections are wedged into said aperture sections and both said stud and aperture sections are cold deformed when said surfaces abut each other to entirely eliminate any clearance between said stud and aperture sections and to securely hold the same together, said apertures having a recess portion at their other ends and said studs having a portion of substantially uniform cross-sectional area at their other ends, said stud portions being deformable to increase the cross-sectional dimensions thereof and fill said recesses, whereby said stud sections remain wedged in said aperture sections and said members are fastened to each other by cold deformation of said stud and aperture sections and said stud portions.

2. A pulley according to claim 1, wherein said stud portions of uniform cross-sectional area are generally cylindrical and said recesses flare upwardly, and wherein an annular edge is provided between said aperture recesses and said aperture sections engaged by said deformable portion of said studs.

References Cited in the file of this patent

UNITED STATES PATENTS

| | | |
|---|---|---|
| 223,948 | Pederson | Jan. 27, 1880 |
| 231,231 | Klein | Aug. 17, 1880 |
| 471,972 | Hall | Mar. 29, 1892 |
| 870,340 | Becroft et al. | Nov. 5, 1907 |
| 1,161,291 | Danielson | Nov. 23, 1915 |
| 2,178,055 | Stupell | Oct. 31, 1939 |